Dec. 29, 1942.     J. E. NELSON     2,306,640
FISH LURE
Filed May 31, 1941
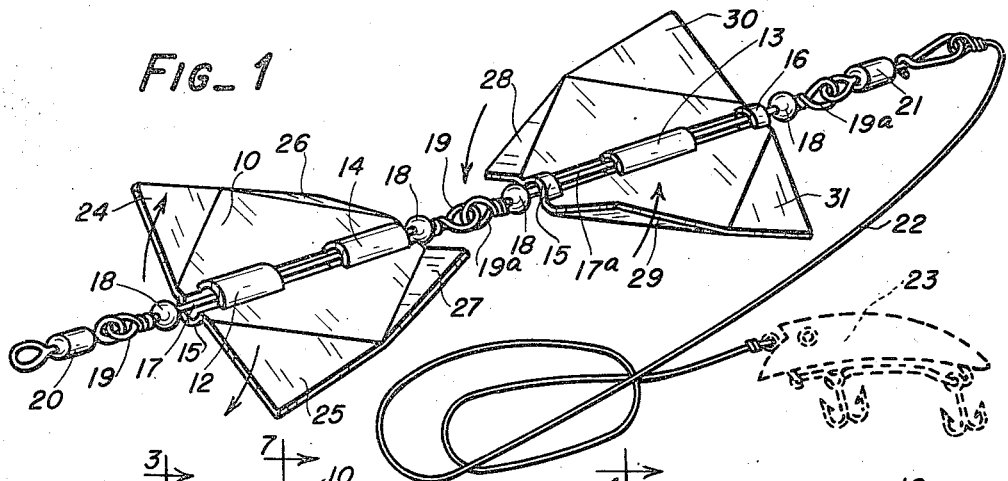
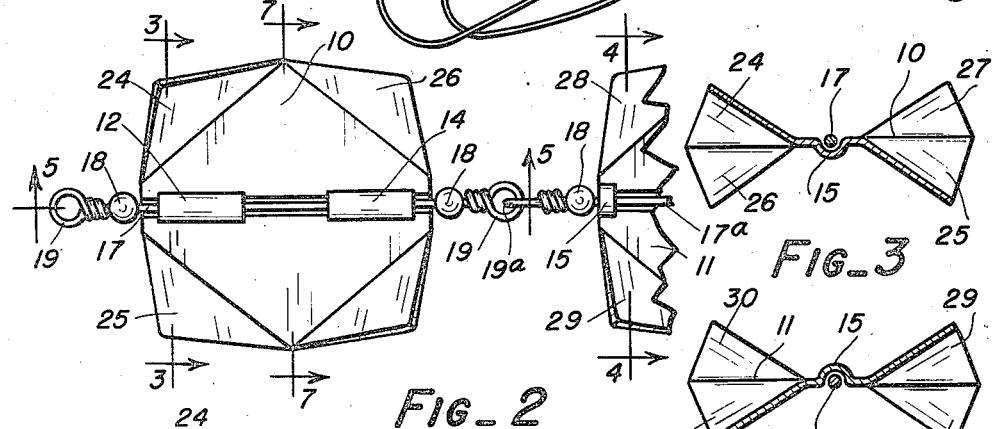
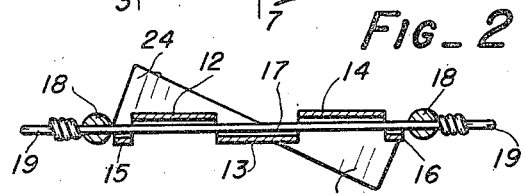
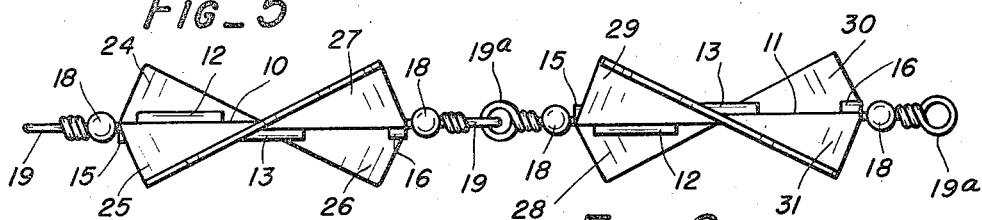
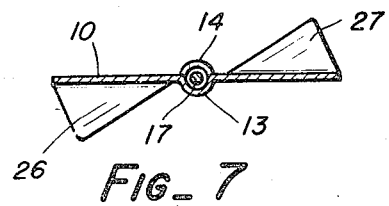
JOHN E. NELSON
INVENTOR
BY *Smith & Tuck*
ATTORNEYS Patented Dec. 29, 1942

2,306,640

UNITED STATES PATENT OFFICE 2,306,640

FISH LURE

John E. Nelson, Seattle, Wash., assignor to Nelson Plug Company, Inc., Seattle, Wash., a corporation of Washington Application May 31, 1941, Serial No. 395,953

6 Claims. (Cl. 43—45)

My present invention relates to improvements in a fish lure of the nature commonly referred to as a "flasher," which is a device, ordinarily provided with bright, light-reflecting surfaces that is designed to attract fish as it is drawn through the water.

An important object of the invention is the provision of a novel fish lure that is simple to construct and is composed of a minimum number of parts.

Another object of the invention resides in the provision of a novel revolvable fish lure that is so arranged and constructed that it will at all times revolve freely for the purposes of luring fish by the presentation of its light-reflecting surfaces and will at the same time avoid kinking and tangling of any of the fishing line, leaders, or other tackle.

A further object of the invention relates to the provision of a counterpoised revolvable fish lure adapted to lure fish while, at the same time, avoiding and preventing kinking of the fish line.

Still another object of the invention is the provision in a fish lure of multiple revolvable members having light-reflecting surfaces and which revolvable members are caused to revolve by the action of their passage through the water through the shape in which they are formed.

A still further object of the invention is to provide in a revolvable fish lure simple, easily formed bearing means for the reception of a draft link about the axis of which a revolvable fish lure member is rotated.

Other objects and advantages of the invention will be apparent during the course of the following description which, taken in view of the accompanying drawing, forms the specification of my invention and discloses a preferred form thereof.

In the drawing:

Figure 1 is a perspective view of the assembled structure comprising my improved fish lure, Figure 2 is a plan view of my fish lure with portions broken away for convenience of illustration, Figures 3 and 4 are each sectional views, taken on lines 3—3, and 4—4 respectively, as indicated in Figure 2, Figure 5 is a longitudinal sectional view taken through a fish lure as indicated by lines 5—5 of Figure 2, Figure 6 is a longitudinal elevational view of my assembled fish lure as though viewing it from the side, Figure 7 is a cross-sectional view taken on the plane indicated by the line 7—7 of Figure 2.

Referring now to the drawing, the numerals 10 and 11 designate the body portions of the paired revolvable members of my fish lure. Each of these body portions is approximately diamond-shaped and is designed to be drawn through the water as is shown in Figure 1. Each body portion is slitted laterally across the longitudinal axis and the material between the slits is deformed or cupped on each side of the axis to provide alternating bearing halves 12, 13, and 14 and end bearing loops 15 and 16.

A draft link or snood 17 is inserted through the bearing members so that the revolvable members may rotate thereon. Adjacent each end of the body of the revolvable member are anti-friction members such as beads 18. Loops 19 are formed on each end of the draft link 17 for attaching the device to a fish line, leader, or another similar lure.

The body member 11 is similarly formed and its draft link or snood 17a has an eye 19a which is looped through the eye 19 on the trailing end of the link member 17 so that the two have a limited rotation with regard to each other.

On the forward eye 19 of the link or snood 17 and on the rear eye 19a of the link or snood 17a I ordinarily employ swivel members 20 and 21, respectively. The swivel 20 is usually attached to a fish line or a fish leader as may be desired. The swivel 21 is shown as a snap swivel and a loop in the leading end of a leader 22 may be engaged in the latching loop of the swivel. I have indicated at 23 in dotted lines a fish lure that may be secured on the terminal end of the leader 22.

Under certain circumstances a fish hook or additional fish luring means may be attached to the rear end of the snood 17a without departing from the spirit of the invention.

The body member 10 has on its forward end divergently arranged angular blades 24 and 25 and on its rear end oppositely disposed angular blades 26 and 27. With this arrangement it can be seen that the blades 24 and 26 on one side of the body 10 are bent oppositely away therefrom along the angular edges of the diamond-shaped body as are also the blades 25 and 27 on the opposite side of the body.

The body 10 by this arrangement will be caused to rotate as it is drawn through the water in a clock-wise direction due to the impingement of the water flowing past the lure upon the angularly disposed faces 24 and 25, and 26 and 27.

The body 11 is caused to rotate therefore in a counter-clockwise motion by reason of the blades 28 and 29 on the forward end and 30 and 31 on the rear ends being disposed oppositely to those on member 10.

The members 10 and 11 will rotate freely about the draft links or snoods 17 and 17a and yet because the draft links are looped together at right angles to each other to prevent twisting as their respective members turn, no twisting or kinking action will be imparted to the fish line, leader, or other paraphernalia employed in connection with the fish lure.

The fit of the bearing members around the draft links is comparatively loose so that the members will revolve very freely and without binding or being affected by friction as would be the case where a close fit is formed. The formation of the bearing members open on one side of the draft link, prevents the accumulation of marine growth, dirt and the like around the draft links which would otherwise hinder the revolving of the fish lure. When the mechanism is employed in salt water and put away without proper drying, salt crystals or other encrustations that will ordinarily form will fall out or can be easily removed from the bearings to free them again. A thin strip of emery cloth can be inserted between the draft link and the bearing member and the bearing be repolished should it become corroded and roughened.

In use, as the device is drawn through the water, light rays are reflected off the various light-reflecting surfaces of each of the revolving members and from a given point the impression is that of alternating flashes of light from adjacent points. The "action" of the fish lure can be governed by the speed with which it is drawn through the water and also by the pitch of the blade portions of each of the revolvable bodies and this may be varied according to the desires of the fisherman, by altering the angle at which they are disposed.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. A fish lure comprising a snood having an eye integral therewith on one end and a spinner member axially rotatable thereon, a second snood having an eye integral therewith and looped in the eye of the aforementioned snood to limit axial rotation thereof, said second snood also having a spinner member axially rotatable thereon, means for drawing said lure through the water, and means for associating hook means with said lure; said spinner members comprising a symmetrical diamond shaped body portion having an axis of rotation diagonally thereacross and axial of the snood, a divergently bent blade on each forward edge of the body portion; and a divergently bent blade on each rear edge of the body portion oppositely arranged with relation to the forward blades.

2. A fish lure comprising a snood having an eye integral therewith on one end and a spinner member axially rotatable thereon, a second snood having an eye integral therewith and looped in the eye of the aforementioned snood to limit axial rotation thereof, said second snood also having a spinner member axially rotatable thereon, means for drawing said lure through the water, and means for associating hook means with said lure, said spinner members each having bearing halves formed therein alternately disposed on either side of the axis of rotation; said members also having divergently bent blades adapted to produce rotary motion of the spinner members when the same is drawn through the water.

3. A fish lure comprising a snood having an eye integral therewith on one end and a spinner member axially rotatable thereon, a second snood having an eye integral therewith and looped in the eye of the aforementioned snood to limit axial rotation thereof, said second snood also having a spinner member axially rotatable thereon, means for drawing said lure through the water, and means for associating hook means with said lure, said spinner members each being wholly symmetrical and having divergently bent blades adapted to produce rotary motion of the spinner members when the same is drawn through the water.

4. A fish lure comprising a snood having an eye integral therewith on one end and a spinner member axially rotatable thereon, a second snood having an eye integral therewith and looped in the eye of the aforementioned snood to limit axial rotation thereof, said second snood also having a spinner member axially rotatable thereon, means for drawing said lure through the water, and means for associating hook means with said lure, said spinner members each having bearing halves formed therein alternately disposed on either side of the axis of rotation and loosely encircling the associated snood.

5. A fish lure comprising a snood having an eye integral therewith on one end and a spinner member axially rotatable thereon, a second snood having an eye integral therewith and looped in the eye of the aforementioned snood to limit axial rotation thereof, said second snood also having a symmetrical spinner member axially rotatable about the axis thereof, means for drawing said lure through the water, and means for associating hook means with said lure.

6. A fish lure comprising a plurality of spinner members mounted for aligned rotation in their travel through the water, means for drawing said lure through the water, and means for associating hook means with said lure, said spinner members each comprising a symmetrical diamond shaped body portion having an axis of rotation diagonally thereacross, a divergently bent blade on each forward edge of the body portion, and a divergently bent blade on each rear edge of the body portion oppositely arranged with relation to the forward blades.

JOHN E. NELSON.